US 9,416,726 B2

(12) United States Patent
Bastos

(10) Patent No.: US 9,416,726 B2
(45) Date of Patent: Aug. 16, 2016

(54) METHOD FOR PRODUCING A GASEOUS FUEL COMPRISING HYDROGEN FROM KINETIC AND/OR POTENTIAL ENERGY RECOVERED FROM A VEHICLE POWERED BY A FOUR STROKE DIESEL ENGINE FITTED WITH AN ENGINE BRAKING MECHANISM AND SYSTEM USEFUL TO IMPLEMENT SUCH METHOD

(71) Applicant: Walderson Miami LLC, Miami, FL (US)

(72) Inventor: Carlos Manuel Bastos, Buenos Aires (AR)

(73) Assignee: Walderson Miami LLC, Miami, FL (US)

( * ) Notice: Subject to any disclaimer, the term of this patent is extended or adjusted under 35 U.S.C. 154(b) by 0 days.

(21) Appl. No.: 14/443,521

(22) PCT Filed: Nov. 15, 2013

(86) PCT No.: PCT/US2013/070283
§ 371 (c)(1),
(2) Date: May 18, 2015

(87) PCT Pub. No.: WO2014/081627
PCT Pub. Date: May 30, 2014

(65) Prior Publication Data
US 2015/0337722 A1    Nov. 26, 2015

Related U.S. Application Data

(60) Provisional application No. 61/728,383, filed on Nov. 20, 2012.

(51) Int. Cl.
*F02B 43/00*    (2006.01)
*C01B 3/30*    (2006.01)
(Continued)

(52) U.S. Cl.
CPC .............. *F02B 43/00* (2013.01); *B01J 8/067* (2013.01); *C01B 3/30* (2013.01); *C01B 3/384* (2013.01);
(Continued)

(58) Field of Classification Search
CPC .......... F02M 21/0206; F02M 21/0227; F02M 25/12; F02B 43/00; F02B 43/02; F02B 43/04; C01B 3/30; C01B 3/384; B01J 8/067
See application file for complete search history.

(56) References Cited

U.S. PATENT DOCUMENTS

| 3,220,392 A | 11/1965 | Cummins |
| 2002/0174798 A1 | 11/2002 | Kumar |

(Continued)

FOREIGN PATENT DOCUMENTS

| WO | 2011/080512 A1 | 7/2011 |
| WO | 2012/123710 A1 | 9/2012 |

OTHER PUBLICATIONS

International Search Report for Application No. PCT/US2013/070283 dated Apr. 14, 2014.

*Primary Examiner* — Lindsay Low
*Assistant Examiner* — Jacob Amick
(74) *Attorney, Agent, or Firm* — Norris McLaughlin & Marcus, P.A.

(57) ABSTRACT

A method for producing a hydrogen gaseous fuel from kinetic and/or potential energy recovered from a vehicle powered by a four stroke Diesel engine fitted with a Jacobs engine brake during a deceleration stage. Such a method comprises the following steps: a) providing a preheated steam flow; b) providing a gas flow from at least one chemical species used as preheated carbon and hydrogen source; c) mixing the gas flow from at least one chemical species used as carbon and hydrogen source from step a) with the steam flow from step b); d) reacting the mixture from step c) in the catalytic bed of a reforming reactor, heated by high temperature air from the compression stage of the Diesel engine acting as engine brake upon deceleration, producing an outlet synthesis gas flow which contains hydrogen; e) causing water to condense in the outlet synthesis gas flow which contains hydrogen, producing a water-free synthesis gas flow, and f) storing the synthesis gas flow obtained at step e) in a reservoir for its subsequent use during an acceleration stage of the vehicle. A system useful to implement the method for recovering kinetic and/or potential energy from a vehicle powered by a four stroke Diesel engine fitted with a Jacobs engine brake during a deceleration stage.

27 Claims, 4 Drawing Sheets

(51) Int. Cl.
   *F02M 21/02*   (2006.01)
   *C01B 3/38*   (2006.01)
   *B01J 8/06*   (2006.01)
   *F02M 25/12*   (2006.01)

(52) U.S. Cl.
   CPC ........... *F02M 21/0227* (2013.01); *F02M 25/12* (2013.01); *B01J 2208/00221* (2013.01); *B01J 2219/00006* (2013.01); *C01B 2203/0233* (2013.01); *C01B 2203/0833* (2013.01); *Y02T 10/121* (2013.01); *Y02T 10/16* (2013.01)

(56) References Cited

U.S. PATENT DOCUMENTS

| | | |
|---|---|---|
| 2005/0279333 A1* | 12/2005 | Kweon ............... C01B 3/34 123/557 |
| 2006/0144349 A1 | 7/2006 | Mirji |
| 2006/0260562 A1 | 11/2006 | Otterstrom et al. |
| 2007/0000454 A1 | 1/2007 | Wang |
| 2009/0241861 A1 | 10/2009 | Sano |
| 2011/0220040 A1 | 9/2011 | McAlister |
| 2012/0201657 A1 | 8/2012 | Donnelly |

\* cited by examiner

METHOD FOR PRODUCING A GASEOUS FUEL COMPRISING HYDROGEN FROM KINETIC AND/OR POTENTIAL ENERGY RECOVERED FROM A VEHICLE POWERED BY A FOUR STROKE DIESEL ENGINE FITTED WITH AN ENGINE BRAKING MECHANISM AND SYSTEM USEFUL TO IMPLEMENT SUCH METHOD

This application is a 371 application of PCT/EP2013/070283 filed Nov. 15, 2013, which claims foreign priority benefit under 35 U.S.C. §119 of U.S. Provisional Application No. 61/728,383 filed Nov. 20, 2012.

FIELD OF THE INVENTION

The present invention relates to the systems and mechanisms that enable energy recovery in motor vehicles powered by internal combustion engines, specifically to those systems and mechanisms used to recover the kinetic energy dissipated into heat upon the braking stage of the vehicle. In particular, this invention relates to a device for transforming the kinetic energy, which is normally dissipated during the braking stage of the vehicle, into chemical energy contained in a gaseous fuel, preferably a synthesis gas. The transformation is achieved by compression of the exhaust gases resulting from engine combustion. These gases are then used in a reforming process with an additional carbon compound to obtain synthesis gas, which will be subsequently used as fuel by the same engine.

BACKGROUND OF THE INVENTION

The background art is characterized by vehicle propulsion mechanisms such as internal combustion engines, which convert the chemical energy contained in fuels to increase the pressure and temperature of a gas, forcing it to perform an expansion cycle which transforms this energy into the mechanical energy then used to power the vehicle, which in turn stores that energy as kinetic energy in its own movement.

This procedure is technically known as thermodynamic cycle. There are several thermodynamic cycles depending on their operating characteristics, including the Otto cycle, the Diesel cycle and the Rankine cycle.

A key feature of internal combustion engines is that they are unable to convert all the chemical energy stored in the fuel, since they transfer some of their heat to a cold source, as described by the laws of thermodynamics. The maximum theoretical efficiency of a thermodynamic cycle is determined by an ideal cycle called the Carnot cycle.

The other main feature of these engines is that they are based on thermal cycles, which involve irreversible physicochemical processes. This means that the engine cannot be turned into a generator and take mechanical energy to produce the chemical energy contained in a fuel.

Besides, most vehicle braking processes use an external device based on friction; thus, kinetic energy ends up being dissipated as heat.

The loss of energy in both the thermodynamic cycle and the braking process has been a permanent concern and has motivated the search for procedures, devices and innovations aiming to optimize fuel consumption in combustion engine vehicles.

One of the lines of research has focused on trying to recover a large portion of the kinetic energy dissipated in the brakes and use it again to accelerate the vehicle. The devices based on this concept have been classified under the acronym KERS, Kinetic Energy Recovery Systems.

Typically, KERS devices allow reducing the speed of a vehicle, turning a portion of its kinetic energy into another type of energy.

While they are mainly used in vehicles powered by electric energy—i.e. trains and subways—they are being used lately in hybrid vehicles, fitted with an internal combustion engine as well as an electric motor generator.

These KERS devices are also known as regenerative braking systems. For electric railways, they are used to feed their own power supply. For battery vehicles and hybrid vehicles, the energy is stored in a battery bank or a condenser bank for subsequent use.

Regenerative braking refers to a type of dynamic braking. Dynamic braking includes processes such as rheostatic braking, by which the electric energy generated by braking is dissipated as heat.

Regenerative brakes are based on the principle that an electric motor can be used as a generator. The electric traction motor is reconnected as a generator during braking and the power terminals are used to supply energy, which is fed into an electrical charge and this charge provides the braking effect.

When an electric train brakes, the traction motor connections are modified via an electronic device that works as an electric generator. For example, brushless DC motors typically have Hall effect sensors to determine rotor position, which provides information on the vehicle and enable calculations on how to feed the current generated in the motor into storage systems, which can consist of batteries or supercapacitors.

Motor fields are connected to the main traction motor and the armatures of the motor are connected to the load. The traction motor excites the motor fields, the wheels of the vehicle—those of a car, a trolley or a locomotive—turn the armature of the motor and the motor will act as a generator. When a motor is acting as a generator, the electrical energy produced by it can be fed through electric resistors, a process called rheostatic braking. If current is sent to the supply line in the case of a trolley or a locomotive, it can be conducted to a battery or a supercapacitor; in the case of an autonomous vehicle with a separate power line, this can be called regenerative braking.

If the movement of the vehicle is decelerated, the current flow through the armature of the motor upon braking must be opposite to that of the current used to drive the motor.

Braking effort is proportional to the product of magnetic strength of the field lines multiplied by the angular frequency of the armature.

For example, document US2002174798 describes a hybrid energy locomotive system having energy storage and a regeneration system. In one form, the system can be either retrofitted into existing locomotives or installed as original equipment in new vehicles. The energy storage and regeneration system captures dynamic braking energy, excess motor energy and externally supplied energy, and stores the energy in one or more energy storage subsystems, including a flywheel, a battery, an ultra-capacitor or a combination of such subsystems. The energy storage and regeneration system can be located in a separate energy tender vehicle. The separate energy tender vehicle is optionally equipped with traction motors. An energy management system is responsive to power storage and power transfer parameters, including data indicative of present and future track profile information, to determine present and future electrical energy storage and supply requirements. The energy management system controls the storage and regeneration of energy accordingly.

Electric regenerative brakes are also used in cars. An early example of this system was the regenerative brake developed in 1967 for the American Motors Corporation's Amitron and Gulton Industries. This car was completely powered by prototype-phase batteries, which were recharged by regenerative braking, resulting in an increase of the vehicle performance.

An alternative system to recover kinetic energy during braking is the flywheel. This component receives energy which would otherwise be dissipated as heat during braking, storing the recovered energy in a flywheel. This system was first used in the regulations for the 2009 Formula One season. Besides reducing costs, this device was designed to increase the number of overtakes during races and to make overtakes easier for the drivers. The system was designed and developed by Xtrac, Torotrack y Flybrid System, as per specifications set forth by the Fédération Internationale de L'Automobile (International Automobile Federation) and the European Union (EU).

Although not widely used, its use was later extended to regular cars. For instance, Toyota has been selling a hybrid model since 2010, the Auris HSD, which includes the regenerative braking system, among other improvements. Since 2007, BMW has been selling some serial models with Diesel and gasoline engines, under the Efficient Dynamics line with various improvements, including a Brake Energy Regeneration system. Currently, this system is used to recharge the battery of the vehicle without constantly using an alternator to charge the battery, either saving fuel or gaining power.

Volvo Car Corporation, a Swedish automobile manufacturer, has also developed in collaboration with Volvo Powertrain and SKF, a new KERS technology that can reduce fuel consumption by up to 25 percent, while enhancing engine performance in regular cars.

The system uses a flywheel to recover the kinetic energy lost during braking. When the car decelerates, the momentum of the car spins up the flywheel to 60,000 rpm. When the car starts off, the rotational force of the flywheel is transmitted to the rear wheels through a specifically designed transmission.

The combustion engine that drives the front wheels is switched off as soon as braking begins. The flywheel energy can be used to accelerate the vehicle when moving off again or to power the vehicle once it reaches cruising speed. Since the flywheel is activated by braking and the energy can be stored for a limited time, this technology is at its most effective during driving featuring repeated stops and starts. To put it differently, fuel efficiency is greater when driving in a heavy traffic city, and also during active driving.

The basic principles of this system can be found, for instance, in the document WO2012123710A1, which describes a high speed flywheel system for a vehicle capable of running at speeds of 20,000 rpm or greater, comprising: a flywheel mounted on a shaft and contained within a housing, and at least one bearing arrangement, where the bearing arrangement is mounted to the flywheel or the housing via an elastomeric component such as a ring and/or a metalastic bush to reduce Boise, vibration and harshness (NVH) and prevent the resonant modes of the flywheel and housing interfering with one another.

On the other hand, publication WO2011080512A1 describes an energy storage and recovery system device for a vehicle, comprising a flywheel, a first and a second set of gears and multiple wet multiplate clutches, wherein one of each gear set is arranged coaxially along a clutch shaft with one of the clutches, and wherein the device is coupled to the vehicle transmission, such that actuation of a clutch redirects the torque path via the gears, thereby enabling multiple rations and therefore, multiple speeds.

However, to this date there are no devices that transform the kinetic energy of a vehicle recovered from braking into fuel for its subsequent use in the same vehicle.

Therefore, it is necessary to improve existing processes or systems to obtain fuel from kinetic energy, thereby reducing fuel consumption in general, decreasing environmental pollution and helping to fight global warming. Besides, usage of equipment without moving parts instead of mechanical components can significantly reduce investment and maintenance costs.

Therefore, and in order to provide alternatives that can be used to help solving this long-standing problem, it would be desirable to promote systems that recover the kinetic energy of a vehicle dissipated during braking, while improving fuel consumption throughout the whole cycle.

For this purpose, the vehicles considered were those powered by Diesel engines with a four-stroke combustion cycle, such as those mounted on large-sized vehicles, with a Jake Brake. In this regards, U.S. Pat. No. 3,220,392 is herein cited and entirely incorporated by reference. This patent was granted on Nov. 30, 1965, to C. L. Cummins, and discloses this type of braking system.

SUMMARY OF THE INVENTION

This invention relates to a method for producing a hydrogen gaseous fuel from the kinetic and/or potential energy recovered from a vehicle powered by a four stroke Diesel engine fitted with an engine brake (Jacobs brake) during a deceleration stage. Such a system comprises the following steps:

a) providing a preheated steam flow, b) providing a gas flow from at least one chemical species used as preheated carbon and hydrogen source, c) mixing the gas flow from at least one chemical species used as carbon and hydrogen source from step a) with the steam flow from step b), d) reacting a mixture of at least one chemical species used as carbon and hydrogen source and steam in the catalytic bed of a reforming reactor, heated by high temperature air from the compression stage of the Diesel engine acting as engine brake upon deceleration, producing an outlet synthesis gas flow which contains hydrogen, e) causing water to condense in the outlet synthesis gas flow which contains hydrogen, producing a water-free synthesis gas flow, and f) storing the synthesis gas flow obtained at step e) in a reservoir for its subsequent use during an acceleration stage of the vehicle.

Preferably, the preheating of step a) can be achieved by exchanging heat through the exhaust gases produced by the engine during normal operation.

Also preferably, the preheating of step a) can be achieved by exchanging heat through the high temperature synthesis gas resulting from step d).

Also preferably, the preheating of step a) can be achieved by exchanging heat with the high temperature air resulting from the compression stage of the Diesel engine acting as an engine brake.

Basically, steam is created in a boiler where water is heated by the exhaust gases produced by the engine during normal operation.

Preferably, the preheating of step b) can be achieved by exchanging heat through the exhaust gases produced by the engine during normal operation.

Alternatively, the preheating of step b) can be achieved by exchanging heat through the high temperature synthesis gas resulting from step d).

Also alternatively, the preheating of step b) can be achieved by exchanging heat with the high temperature air resulting from the compression stage of the Diesel engine acting as an engine brake.

In a preferred method for producing a gaseous fuel, the mixture of the steam flow from step a) with the gas flow from step b) from the at least one chemical species used as carbon and hydrogen source, takes place in a gas mixer.

In another preferred method for producing a gaseous fuel, the mixture of the steam flow from step a) with the gas flow from step b) from the at least one chemical species used as carbon and hydrogen source, takes place in the catalytic bed of a reforming reactor.

Particularly, the at least one chemical species used as carbon and hydrogen source is selected from the group of alkanes consisting of methane, ethane, propane, butane, and their mixtures, and from the group of alcohols consisting of methanol, ethanol, propanol, and their mixtures.

In one of the methods, the synthesis gas is mixed with the fuel used by the Diesel engine during an acceleration stage of the vehicle.

In another form, the synthesis gas is mixed with the feeding air used by the Diesel engine during an acceleration stage of the vehicle.

Especially, mixture ratios are controlled by means of an Electronic Fuel Injection Controller (EFIC).

Basically, the four-stroke Diesel engine is mounted in a large-sized vehicle.

Preferably, the large vehicle should be a truck, a bus, a larger long distance bus, a piece of farming machinery and a train engine.

A further object of the present invention is to provide a kinetic energy recovery system for use in a four-stroke Diesel engine-driven vehicle equipped with an engine brake (Jacobs brake) during a deceleration stage, in the form of a gaseous fuel containing hydrogen. Such a system comprises:

a water container, a pump which draws water from the container, and an exchanger that can exchange heat with the hot air produced by the Diesel engine acting like an engine brake, and which vaporizes the incoming water and raises the temperature of the steam generated, a container with at least one chemical species used as carbon and hydrogen source, and an exchanger able to exchange heat with the hot air produced by the Diesel engine working as an engine brake, and which vaporizes at least one incoming chemical species used as carbon and hydrogen source and raises the temperature of the at least one chemical species used as carbon and hydrogen source, a reactor for reforming at least one chemical species used as preheated carbon and hydrogen source coming from the container of said chemical species used as carbon and hydrogen source, with preheated steam coming from the water container, wherein said reforming reactor also includes an outlet duct for synthesis gas that contains hydrogen, and is only capable of exchanging heat with the hot air resulting from the Diesel engine acting as an engine brake upon deceleration, a means for delivering the hot air to the reactor only during engine braking, and a heat exchanger that cools the synthesis gas at the exit of the reforming reactor, a liquid/vapor separator with external loss of heat, connected to the reactor in order to recover unreacted water from the synthesis gas, and a container for said synthesis gas which contains hydrogen and constitutes the gaseous fuel coming from the reforming reactor.

Preferably, the system for recovering kinetic and/or potential energy from a vehicle further comprises one or more additional heat exchangers interspersed between the operational units in order to optimize the use of the heat in the system.

Also preferably, the system for recovering kinetic and/or potential energy from a vehicle further comprises a gas mixer where the preheated steam flow and the at least one chemical species used as carbon and hydrogen source in a preheated gas phase converge for their homogenization prior to entering the reforming reactor.

Also preferably, the system for recovering kinetic and/or potential energy from a vehicle further comprises a water vaporization boiler that receives the water pumped from the water container, and whose heating is provided by the thermal exchange of the hot air produced by the Diesel engine acting as an engine brake, and/or from the exhaust gases produced by the Diesel engine during acceleration, and/or by means of thermal recovery of the system itself.

Also preferably, the system for recovering kinetic and/or potential energy from a vehicle further comprises a gas mixer where the steam flow from the vaporization boiler and the at least one chemical species used as carbon and hydrogen source in a preheated gas phase converge for their homogenization prior to entering the reforming reactor.

Substantially, the system for recovering kinetic and/or potential energy from a vehicle further comprises a container of the at least one chemical species used as carbon and hydrogen source in a liquid state and a pump which takes this at least one chemical species used as carbon and hydrogen source to take it to at least one heat exchanger, where it is turned into vapor and preheated.

Also basically, the system for recovering kinetic and/or potential energy from a vehicle further comprises a gas mixer where the incoming preheated steam flow and the at least one chemical species used as carbon and hydrogen source in a preheated gas phase converge for their homogenization prior to entering the reforming reactor.

Particularly, the at least one chemical species used as carbon and hydrogen source is selected from the group of alkanes consisting of methane, ethane, propane, butane, and their mixtures, and from the group of alcohols consisting of methanol, ethanol, propanol, and their mixtures.

In a preferred embodiment of the system for recovering kinetic and/or potential energy from a vehicle, the synthesis gas is dosed from the reservoir and is mixed with the fuel used by the Diesel engine during an acceleration stage of the vehicle.

In another preferred embodiment of the system for recovering kinetic and/or potential energy from a vehicle, the synthesis gas is dosed from the reservoir and is mixed with the feeding air used by the Diesel engine during an acceleration stage of the vehicle.

Especially, mixture ratios are controlled by means of an Electronic Fuel Injection Controller (EFIC).

Basically, the system for recovering kinetic and/or potential energy from a vehicle powered by a four-stroke Diesel engine is mounted on a large-sized vehicle.

Preferably, the large vehicle should be a truck, a bus, a larger long distance bus, a piece of farming machinery and a train engine.

DESCRIPTION OF THE INVENTION IN DETAIL

Figure 1:
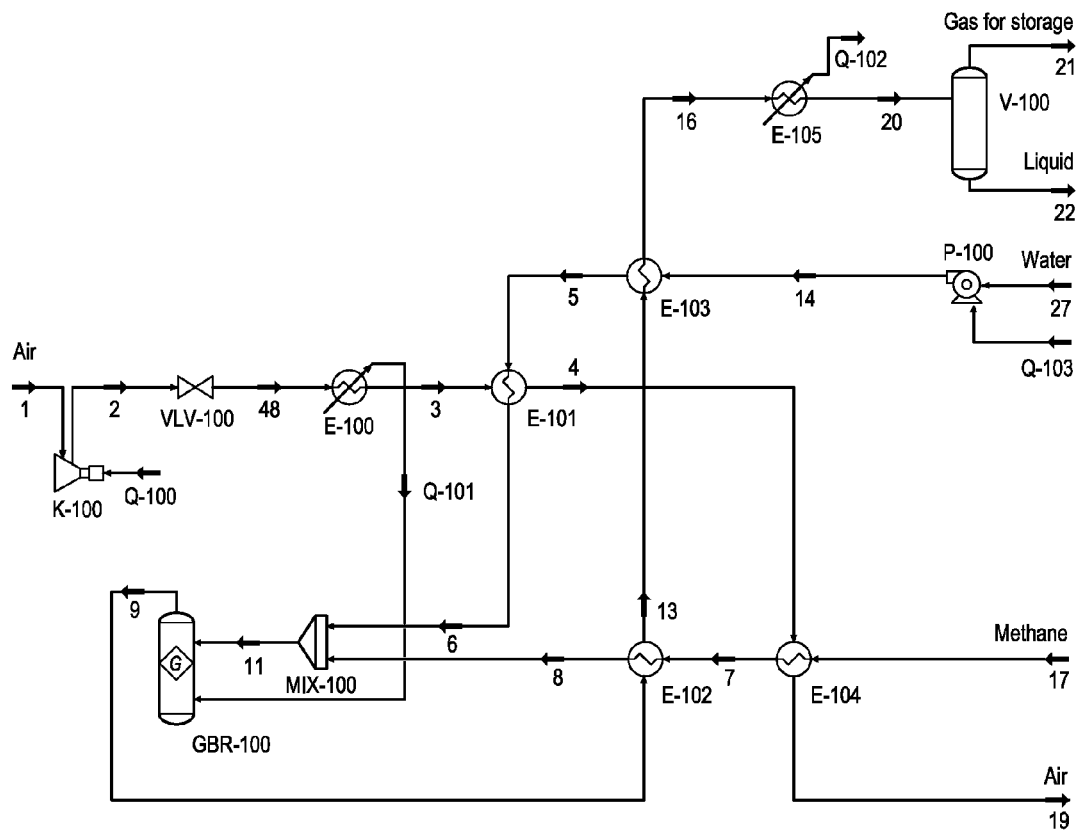
FIG. 1 shows a preferred form of a flow diagram for a system designed to implement the method of present invention, using methane as carbon and hydrogen source.

As mentioned above, in order to reduce energy consumption of vehicles, recently the focus has been set on the development of hybrid systems that recycle brake energy to be used in the same vehicle to reduce fuel consumption. The concept is old and its first commercial deployments were done in electric train systems.

Currently, hybrid systems have been developed and deployed in regular automobiles, storing the recovered braking energy in electric batteries. These are relatively complex systems, since they require a drive system based on internal combustion engines, combined with electric motors supplied by batteries.

A method and system to recover energy based on thermochemical means is hereby proposed. The concept is based on recycling brake energy dissipated to the environment as hot air through the systems known as Compression Release Engine Brake, Jacobs Engine Brake, or simply Jake Brake, referring to Jacobs Vehicle Systems®, one of the best known brands in this type of devices. It aims to achieve the use of this energy by catalytic reforming a chemical species used as carbon and hydrogen source with steam. Reforming gases have a higher calorific value than the original fuel, representing an energy gain.

Basically, a Diesel engine becomes a compressor during the braking stage of a vehicle with this type of engine, compressing atmospheric air. The compression work causes the vehicle to brake. This concept, as mentioned above, was patented by Cleese L. Cummins in 1965 (U.S. Pat. No. 3,220, 392) and is widely known as Jake Brake.

The reduction of kinetic and/or potential energy of the vehicle driven by a Diesel engine is transformed in thermal energy, as hot air. The air is expelled between about 600° C. and about 650° C., and a compression ratio of about 18:1 and an adiabatic efficiency of compression of approximately 98%. The increased temperature is used to provide heat to the reforming process, which is endothermic.

The hydrogen-rich reforming gas is then compressed and stored for its subsequent use in the Diesel engine as fuel, combined with Diesel fuel during acceleration.

In other words, this invention relates to a method for recovering, storing and subsequently using the energy contained in hot air from a Diesel engine fitted with an engine brake known as Jacobs brake or "Jake Brake", during a deceleration stage to produce a gaseous fuel or reforming gas known as synthesis gas to be later used by the same engine during an acceleration stage of the vehicle.

The engine braking mechanism or Jacobs brake uses air compression in the cylinders of the engine to absorb energy during braking while cutting fuel supply to these cylinders; the engine brake is controlled by a control unit operable by the driver upon braking and the four stroke Diesel engine has at least one intake and one exhaust pipe.

Therefore, the method for obtaining a gaseous fuel or "synthesis gas" by recovering kinetic energy of a vehicle during a deceleration stage basically comprises:

i) a reforming stage carried out in a reforming chamber, where a chemical species used as carbon and hydrogen source and steam are mixed through a hot catalytic bed heated by high temperature air from the compression stage of the Diesel engine acting as engine brake upon deceleration, producing a synthesis gas, ii) a separation stage, carried out in a vapor-liquid separator, where the remaining water is separated from the synthesis gas, iii) a heat exchange stage, carried out through multiple exchangers, where the reformed air or gas transfer their heat to the steam and/or the fuel, and iv) a steam heating stage carried out in a boiler where the steam is heated by the exhaust gases produced by the engine during normal operation.

In particular, this invention relates to a method for producing a hydrogen gaseous fuel from kinetic and/or potential energy recovered from a vehicle powered by a four stroke Diesel engine fitted with an engine brake (Jacobs brake) during a deceleration stage. Such a system comprises the following steps:

a) providing a preheated steam flow, b) providing a gas flow from at least one chemical species used as preheated carbon source, c) mixing the gas flow from the at least one chemical species used as carbon source from step a) with the steam flow from step b), d) reacting a mixture of at least one chemical species used as carbon and hydrogen source and steam in the catalytic bed of a reforming reactor, heated only by high temperature air from the compression stage of the Diesel engine acting as engine brake upon deceleration, producing an outlet synthesis gas flow which contains hydrogen.

e) causing water to condense in the outlet synthesis gas flow which contains hydrogen, producing a water-free synthesis gas flow, and f) storing the synthesis gas flow obtained at step e) in a reservoir for its subsequent use during an acceleration stage of the vehicle.

Preferably, the preheating of step a) can be achieved by exchanging heat through the exhaust gases produced by the engine during normal operation. This method widens the scope of recovery of the heat generated by the engine during acceleration of the vehicle.

Also preferably, the preheating of step a) can be achieved by exchanging heat through the high temperature synthesis gas resulting from step d). This alternative enables the use of heat generated by reforming gases to preheat steam.

Also preferably, the preheating of step a) can be achieved by exchanging heat with the high temperature air resulting from the compression stage of the Diesel engine acting as an engine brake. This alternative uses the same hot air generated by the engine acting as compressor during braking. While a viable alternative, this is not the best option since the hot air generated by the engine during braking is better used for reforming.

Eventually, steam can be preheated by combining the alternatives described above, applied in pairs or using the three of them depending on the engine and the design of the system to be implemented, which should be the most efficient for a given vehicle.

Basically, steam is created in a boiler where water is heated by the exhaust gases produced by the engine during normal operation. Steam can be generated inside a boiler for this purpose, whose temperature is maintained by the gases and/or the hot air coming from the engine during acceleration or braking and/or the residual heat of the reforming gases obtained.

This is also the case for the flow of the at least one chemical species used as carbon and hydrogen source for reforming, where the preheating at step b) is achieved by exchanging heat through the exhaust gases produced by the engine during normal operation; alternatively, the preheating can be achieved by exchanging heat with the high temperature synthesis gas from step d), and/or also alternatively, the preheating can be achieved by exchanging heat with the high temperature air from the compression stage where the Diesel engine acts as an engine brake.

In order to produce a gaseous fuel by reforming, the steam flow from step a) is mixed with the gas flow of step b) from the at least one chemical species used as carbon source in a gas mixer before entering the reforming reactor.

In another preferred form, the mixture of the steam flow from step a) with the gas flow of step b) from the at least one chemical species used as carbon source, takes place in the catalytic bed of the reforming reactor.

Preferably, the mixture should be performed prior to entering the reforming reactor for a better efficiency and, eventually, both flows can be thoroughly mixed together via a mixing chamber assembled within the reactor, in front of each tube.

Particularly, this chemical species used as carbon and hydrogen source are selected from the group of alkanes consisting of methane, ethane, propane, butane, and their mixtures, and from the group of alcohols consisting of methanol, ethanol, propanol, and their mixtures. Any of these chemical species can be used as carbon and hydrogen source, being all of them relatively available in the market.

Hydrogen synthesis gas or fuel is stored in a special container, available for its subsequent use by the engine during acceleration. In another form, the synthesis gas is mixed with the fuel used by the Diesel engine during an acceleration stage of the vehicle while, optionally, the synthesis gas is mixed with the feeding air used by the Diesel engine during an acceleration stage.

Especially, ratios of mixture of synthesis gas versus the Diesel fuel or feeding air used by the engine are controlled by means of an Electronic Fuel Injection Controller (EFIC).

Basically, the four stroke Diesel engine with a Jacobs brake used to apply the method described is mounted on a large vehicle, which should be a truck, a bus, a larger long distance bus, a road construction machine, a farming machine and a locomotive.

Therefore, the method of the invention enables recovery of kinetic and/or potential energy which typically dissipates during a deceleration stage of a vehicle with a Diesel engine preferably a large vehicle, such as those used for transport of passengers and loads. The energy which is otherwise wasted at the brakes during the braking stage can be converted into fuel at a range of 20-50%, approximately, preferably 30-40%, approximately.

This method is applied with equipment based in fully fledged technology, supported by decades of experience in industrial applications, which ensures an especially high level of reliability. Equipment requires minimum maintenance and the assembly of the system to implement the method proposed on existing engines does not require highly qualified workmanship or expert work.

The chemicals species used as carbon and hydrogen source, i.e. methane, ethane, propane, butane, methanol, ethanol, propanol, or mixtures of these compatible species, as required, is reacted with steam to generate the synthesis gas, carbon monoxide and hydrogen in a homogeneous, tubular continuous-flow catalytic reactor.

FIG. 1 shows a flowchart for recovering part of the energy made available by a vehicle fitted with an engine braking mechanism known as Jacobs brake or "Jake Brake" when braking, which utilizes conventional reforming reactions of methane ($CH_4$), uses the engine as compressor, and makes use of the energy contained in the exhaust gases of the compressor.

In flowchart of FIG. 1 it is shown the atmospheric air intake to the compressor K-100, which is the engine of the vehicle, through flow 1. Flows 2, 48, 3, 4 and 19 correspond to hot air flow, wherein flow 2 passes through a pressure reduction valve VLV-100 giving flow 48, which passes through heat-exchangers, thus giving up its heat or calorific energy to the catalytic reactor, conformed by heat-exchanger E-100 and reaction zone GBR-100, through Q-101; to the water flow in heat-exchanger E-101; and to the methane flow in heat-exchanger E-104, being flow 19 the cooled air outflow.

Water enters through flow 27, and is driven by the water pump P-100, which energy of operation is represented by Q-103. Flows 14, 5 and 6 correspond to pumped water, preheated water and steam, respectively.

Pressurized methane intake is through flow 17, while flows 7 and 8 are preheated methane.

Water as steam and hot methane of flows 6 and 8, respectively, merge in the mixer MIX-100, and enter the reaction zone of the catalytic reactor GBR-100 as flow 11. There, chemical reactions take place, which allow obtaining hydrogen, carbon monoxide and carbon dioxide in variable amounts, depending upon operational conditions.

At the catalytic reactor reaction zone GBR-100 outlet, namely flow 9, there is a mixture composed of steam and unreacted methane, carbon monoxide, carbon dioxide and hydrogen.

Flow 9 leaves the GBR-100 with calorific energy that can still be utilized, and it is used to preheat methane and water in heat-exchangers E-102 and E-103, respectively.

Subsequently, the precooled synthesis gas flow 13 and flow 16 enters the heat-exchanger E-105, where it dissipates heat to the environment (dissipated calorific energy) represented by Q-102. Thus, the residual water from the reaction is condensed and the gases are ready for storage. The condensation zone of a two-phase separator V-100 makes it possible to obtain condensed water in the bottom, i.e. flow 22, and the flow of gases to store at the top, i.e. flow 21, from flow 20. E-105 and V-100 together represent a condenser.

For a quick reference of FIG. 1 components, please refer to the following Table:

| Reference Table of FIG. 1 | |
|---|---|
| Ref. No. | Description |
| *Air: energy and matter flows* | |
| 1 | Atmospheric air intake |
| 2 | Compressed air obtained during engine braking with Jake Brake |
| 48 | Hot air flow |
| Q-101 | Calorific energy transmission (from E-100 to GBR-100) |
| 3 | Hot air flow |
| 4 | Hot air flow |
| 19 | Cooled air outflow |
| *Methane: matter flows* | |
| 17 | Pressurized methane intake |
| 7 | Preheated methane |
| 8 | Preheated methane |
| 11 | Steam/hot methane mixture |

-continued

Reference Table of FIG. 1

| Ref. No. | Description |
|---|---|
| | Water: energy and matter flows |
| 27 | Liquid water intake |
| Q-103 | Water pump energy necessary for operation thereof |
| 14 | Pumped water |
| 5 | Preheated water |
| 6 | Steam |
| 22 | Condensed water outlet |
| | Synthesis gas: energy and matter flows |
| 9 | Synthesis gas from the catalytic reactor |
| 13 | Precooled synthesis gas |
| 16 | Precooled synthesis gas |
| Q-102 | Calorific energy transmission (from E-100) |
| 20 | Synthesis gas plus condensed water |
| 21 | Dried synthesis gas to storage |
| | Components of the system |
| K-100 | Jake Brake compressor |
| VLV-100 | Pressure reduction valve |
| E-100 + GBR-100 | Catalytic Reactor (Heat exchanger + Reaction zone) |
| MIX-100 | Steam and hot methane mixer |
| E-101 | Heat exchanger of water flow (boiler) |
| E-102 | Heat exchanger of methane flow |
| E-103 | Heat exchanger of water flow |
| E-104 | Heat exchanger of methane flow |
| E-105 + V-100 | Two-phase separator (Heat exchanger + Condensation zone) |
| P-100 | Water pump |

Figure 2:
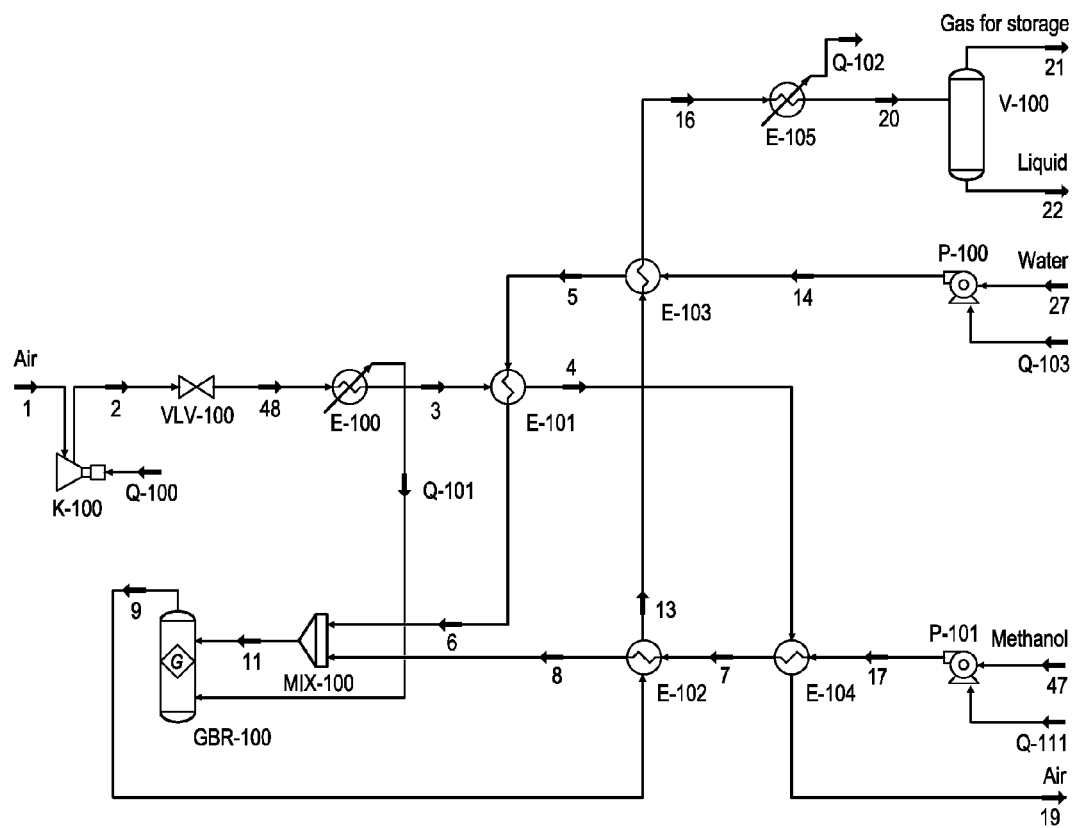
FIG. 2 shows a preferred form of a flow diagram for a system designed to implement the method of present invention, using methanol as carbon and hydrogen source.

In turn, FIG. 2 shows a flowchart for recovering part of the energy made available by a vehicle fitted with an engine braking mechanism known as Jacobs brake or "Jake Brake" when braking, which utilizes reforming reactions of methanol ($CH_3OH$), uses the engine as compressor, and makes use of the energy contained in the exhaust gases of the compressor.

The flowchart is similar to that of FIG. 1 for methane reforming with the addition of the pump P-101, which energy of operation is represented by Q-103, and allows pumping flow 47 of liquid methanol stored in a tank at atmospheric pressure. Then, flows 17, 7 and 8 correspond to pumped liquid methanol, preheated methanol and vaporized methanol, respectively.

Water as steam and hot vaporized methanol of flows 6 and 8, respectively, merge in the mixer MIX-100, and enter the reaction zone of the catalytic reactor GBR-100 as flow 11.

In this case, methanol and water reforming reactions take place which allow obtaining hydrogen, carbon monoxide and carbon dioxide in variable amounts, depending upon operating conditions.

The remaining references of FIG. 2 are equivalent to those of FIG. 1. For a quick reference of FIG. 2 components, please refer to the following Table:

Reference Table of FIG. 2

| Ref. No. | Description |
|---|---|
| | Air: energy and matter flows |
| 1 | Atmospheric air intake |
| 2 | Compressed air obtained during engine braking with Jake Brake |
| 48 | Hot air flow |
| Q-101 | Calorific energy transmission (from E-100 to GBR-100) |

-continued

Reference Table of FIG. 2

| Ref. No. | Description |
|---|---|
| 3 | Hot air flow |
| 4 | Hot air flow |
| 19 | Cooled air outflow |
| | Methanol: energy and matter flows |
| 47 | Liquid methanol intake |
| Q-111 | Methanol pump energy necessary for operation thereof |
| 17 | Pumped liquid methanol |
| 7 | Preheated methanol |
| 8 | Vaporized methanol |
| 11 | Steam/vaporized methanol mixture |
| | Water: energy and matter flows |
| 27 | Liquid water intake |
| Q-103 | Water pump energy necessary for operation thereof |
| 14 | Pumped water |
| 5 | Preheated water |
| 6 | Steam |
| 22 | Condensed water outlet |
| | Synthesis gas: energy and matter flows |
| 9 | Synthesis gas from the catalytic reactor |
| 13 | Precooled synthesis gas |
| 16 | Precooled synthesis gas |
| Q-102 | Calorific energy transmission (from E-100) |
| 20 | Synthesis gas plus condensed water |
| 21 | Dried synthesis gas to storage |
| | Components of the system |
| K-100 | Jake Brake compressor |
| VLV-100 | Pressure reduction valve |
| E-100 + GBR-100 | Catalytic Reactor (Heat exchanger + Reaction zone) |
| MIX-100 | Steam and hot vaporized methane mixer |
| E-101 | Heat exchanger of water flow (boiler) |
| E-102 | Heat exchanger of methane flow |
| E-103 | Heat exchanger of water flow |
| E-104 | Heat exchanger of methane flow |
| E-105 + V-100 | Two-phase separator (Heat exchanger + Condensation zone) |
| P-100 | Water pump |
| P-101 | Methanol pump |

Figure 3:
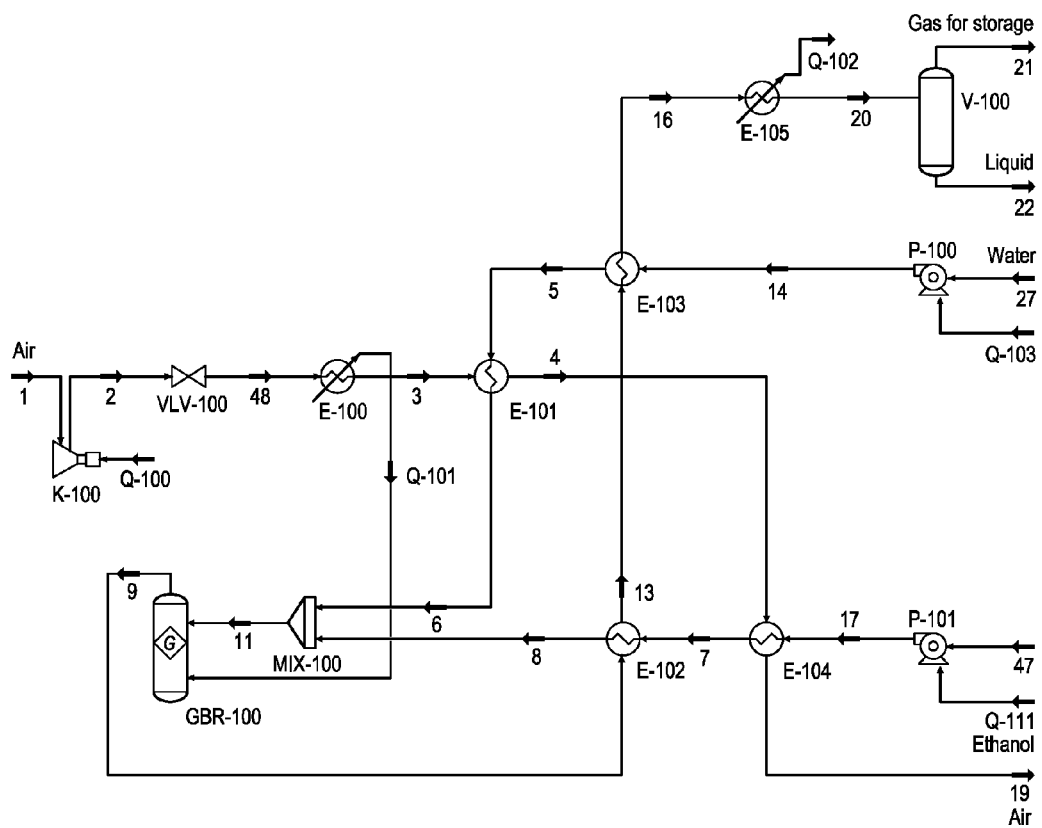
FIG. 3 shows a preferred form of a flow diagram for a system designed to implement the method of present invention, using ethanol as carbon and hydrogen source.

FIG. 3 shows a flowchart for recovering part of the energy made available by a vehicle fitted with an engine braking mechanism known as Jacobs brake or "Jake Brake" when braking, which utilizes reforming reactions of ethanol ($C_2H_5OH$), uses the engine as compressor, and makes use of the energy contained in the exhaust gases of the compressor.

The flowchart is similar to that of FIG. 1 for methane reforming, wherein pump P-101 allows pumping flow 47 of liquid ethanol, which is stored in a tank at atmospheric pressure.

Then, flows 17, 7 and 8 correspond to pumped liquid ethanol, preheated ethanol and vaporized ethanol, respectively.

Water as steam and hot vaporized ethanol of flows 6 and 8, respectively, merge in the mixer MIX-100, and enter the reaction zone of the catalytic reactor GBR-100 as flow 11.

In this case, ethanol and water reforming reactions take place which allow obtaining hydrogen, carbon monoxide and carbon dioxide in variable amounts, depending upon operating conditions.

The remaining references of FIG. 3 are equivalent to those of FIG. 1. For a quick reference of FIG. 3 components, please refer to the following Table:

| Reference Table of FIG. 3 | |
|---|---|
| Ref. No. | Description |
| Air: energy and matter flows | |
| 1 | Atmospheric air intake |
| 2 | Compressed air obtained during engine braking with Jake Brake |
| 48 | Hot air flow |
| Q-101 | Calorific energy transmission (from E-100 to GBR-100) |
| 3 | Hot air flow |
| 4 | Hot air flow |
| 19 | Cooled air outflow |
| Ethanol: energy and matter flows | |
| 47 | Liquid ethanol intake |
| Q-111 | Ethanol pump energy necessary for operation thereof |
| 17 | Pumped liquid ethanol |
| 7 | Preheated ethanol |
| 8 | Vaporized ethanol |
| 11 | Steam/vaporized ethanol mixture |
| Water: energy and matter flows | |
| 27 | Liquid water intake |
| Q-103 | Water pump energy necessary for operation thereof |
| 14 | Pumped water |
| 5 | Preheated water |
| 6 | Steam |
| 22 | Condensed water outlet |
| Synthesis gas: energy and matter flows | |
| 9 | Synthesis gas from the catalytic reactor |
| 13 | Precooled synthesis gas |
| 16 | Precooled synthesis gas |
| Q-102 | Calorific energy transmission (from E-100) |
| 20 | Synthesis gas plus condensed water |
| 21 | Dried synthesis gas to storage |
| Components of the system | |
| K-100 | Jake Brake compressor |
| VLV-100 | Pressure reduction valve |
| E-100 + GBR-100 | Catalytic Reactor (Heat exchanger + Reaction zone) |
| MIX-100 | Steam and hot vaporized ethanol mixer |
| E-101 | Heat exchanger of water flow (boiler) |
| E-102 | Heat exchanger of ethanol flow |
| E-103 | Heat exchanger of water flow |
| E-104 | Heat exchanger of ethanol flow |
| E-105 + V-100 | Two-phase separator (Heat exchanger + Condensation zone) |
| P-100 | Water pump |
| P-101 | Methanol pump |

Figure 4:
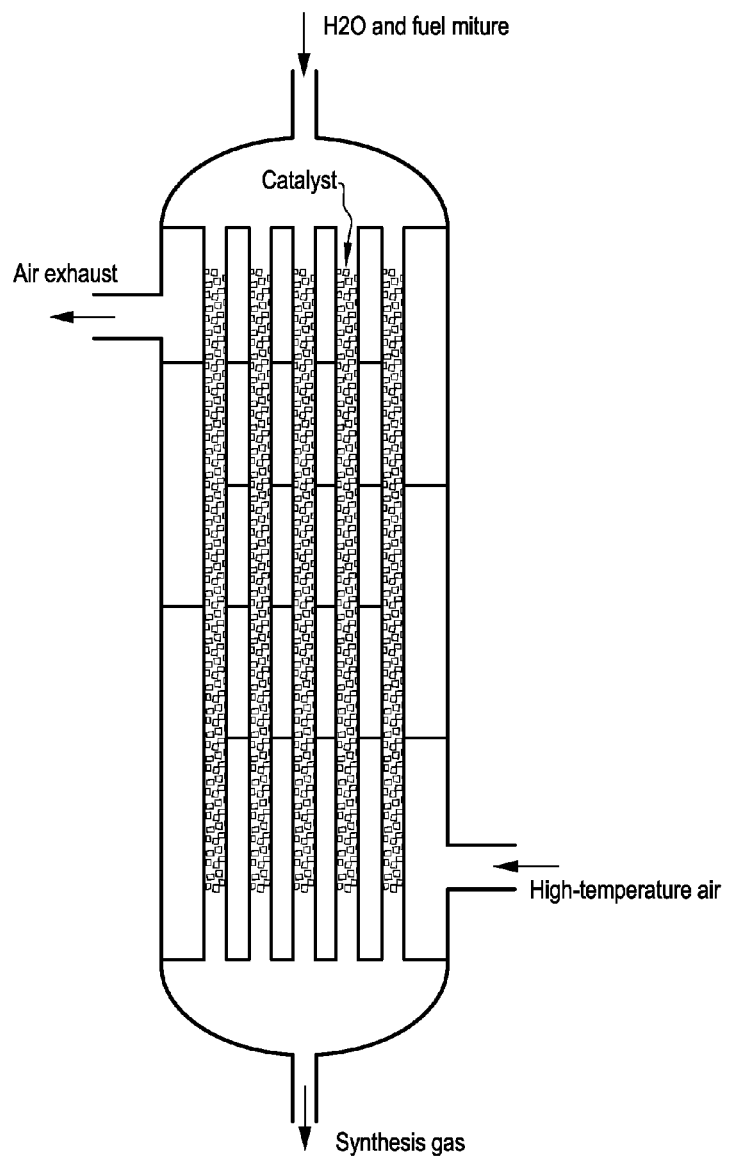
FIG. 4 shows a prior art fixed bed reactor comprising on or more tubes packed with catalyst particles, where the reaction that generates synthesis gas inside a jacket for heat exchange.

Fixed bed reactors usually have one or more tubes packed with catalyst particles, as shown in FIG. 4; in this case, heat is provided by the high temperature air that flows perpendicular to the tubes (i.e., in cross-flow), while the products to be reacted circulate through the tubes. Catalytic particles include nickel, preferably $Ni/Al_2O_3$, iron, noble metals, rare earths, and their combinations, and their constituent material, size and shape may vary; they can be: granular, cylindrical, spherical, etc. In some cases, notably with metallic catalysts such as platinum, wire meshes are used instead of metal particles.

Given the need to optimize the use of heat, it is not possible to use only one large-diameter tube packed with the catalyst. Instead, the reactor must be built with a certain number of tubes mounted on a single cylindrical body. Energy exchange is achieved by forcing high temperature air coming from a compression cycle of the engine acting as brake to circulate inside the jacket that wraps these tubes.

To achieve a considerable calorific effect, the catalyst tubes must be small—e.g. a diameter of up to about 2.54 cm (about 1 inch). The diameter of the tubes and the number of tubes needs to be calculated correctly based on the brake power obtained with each engine using the method described herein.

The equipment required to apply this method also comprises heat exchangers. These devices are commonly used in the present state of the art, and are designed to allow hot air to deliver the energy coming from the engine during the braking stage, based on the heat to be exchanged.

Pumps and separators used in the tested systems are also widely used devices whose engineering can be handled by a person with average knowledge of the technical field.

Thus, it is a further object of the present invention to describe a system to implement the method for recovering kinetic and/or potential energy dissipated by a large vehicle during braking, which comprises a fixed bed reactor where the reforming reaction takes place, using the calorific energy produced by the engine, acting as a compressor.

The system for recovering the kinetic and/or potential energy from a vehicle powered by a four stroke Diesel engine fitted with an engine brake (Jacobs brake) during a deceleration stage in the form of an hydrogen gaseous fuel comprises:

a water container, a pump which draws water from the container, and an exchanger that can exchange heat with the hot air produced by the Diesel engine acting like an engine brake, and which vaporizes the incoming water and raises the temperature of the steam generated, a container with at least one chemical species used as carbon and hydrogen source, and an exchanger able to exchange heat with the hot air produced by the Diesel engine working as an engine brake, and which vaporizes at least one incoming chemical species used as carbon and hydrogen source and raises the temperature of the at least one chemical species, a reactor for reforming at least one chemical species used as preheated carbon and hydrogen source coming from the container of said chemical species used as carbon and hydrogen source, with preheated steam coming from the water container, where said reforming reactor also includes an outlet duct for synthesis gas that contains hydrogen, and is only capable of exchanging heat with the hot air resulting from the Diesel engine acting as an engine brake upon deceleration, a means for delivering the hot air to the reactor only during engine braking, and a heat exchanger that cools the synthesis gas at the exit of the reforming reactor, a liquid/vapor separator with external loss of heat, connected to the reactor in order to recover unreacted water from the synthesis gas, and a container for said synthesis gas which contains hydrogen and constitutes the gaseous fuel coming from the reforming reactor.

Preferably, the system for recovering kinetic and/or potential energy from a vehicle further comprises one or more additional heat exchangers interspersed between the operational units in order to optimize the use of the heat. Heat exchangers are interconnected to maximize recovery of the heat produced by the engine and the system itself.

Also preferably, the system for recovering kinetic and/or potential energy from a vehicle further comprises a gas mixer where the preheated steam flow and the at least one chemical species used as carbon and hydrogen source in a preheated gas phase converge for their homogenization prior to entering the reforming reactor.

Alternatively, preheated steam and the gas flow from the at least one chemical species used as carbon and hydrogen source is mixed in the same reforming reactor or inside specific mixing chambers mounted inside the reactor at each tube inlet.

Also preferably, the system for recovering kinetic and/or potential energy from a vehicle further comprises a water vaporization boiler that receives the water pumped from the water container, and whose heating is provided by the thermal exchange of the hot air produced by the Diesel engine acting as an engine brake, and/or from the exhaust gases produced by the Diesel engine during an acceleration, and/or by means of thermal recovery of the system itself.

The system for recovering kinetic and/or potential energy from a vehicle further comprises a gas mixer where the steam flow from the vaporization boiler and the at least one chemical species used as carbon and hydrogen source in a preheated gas phase converge for their homogenization prior to entering the reforming reactor.

Likewise, the system for recovering kinetic and/or potential energy from a vehicle further comprises a container of the at least one chemical species of carbon and hydrogen in a liquid state and a pump which takes said at least one chemical species to take it to at least one heat exchanger, where it is turned into vapor and preheated.

Also basically, the system for recovering kinetic and/or potential energy from a vehicle further comprises a gas mixer where the incoming preheated steam flow and the at least one chemical species used as carbon and hydrogen source in a preheated gas phase converge for their homogenization prior to entering the reforming reactor.

Particularly, the at least one chemical species used as carbon and hydrogen source is selected from the group of alkanes consisting of methane, ethane, propane, butane, and their mixtures, and from the group of alcohols consisting of methanol, ethanol, propanol, and their mixtures. These compounds are the carbon and hydrogen source required to carry out the reaction inside the reforming reactor.

In a preferred embodiment, the synthesis gas obtained by recovering the kinetic and/or potential energy of the vehicle is dosed from the reservoir and mixed with the fuel used by the Diesel engine during an acceleration stage of the vehicle. Optionally, the synthesis gas is dosed from the reservoir and mixed with the feeding air used by the Diesel engine during an acceleration stage of the vehicle.

Especially, ratios of mixture of synthesis gas in the Diesel fuel or feeding air which enters the engine are controlled by means of an Electronic Fuel Injection Controller (EFIC).

The system for recovering kinetic and/or potential energy from a vehicle powered by a four stroke Diesel engine is mounted on a large vehicle, which could be a truck, a bus, a larger long distance bus, a road construction machine, a farming machine and a locomotive.

Below is a description of the method and system applied to a Diesel engine fitted with a braking mechanism known as Jacobs engine brake or Jake Brake, considering only one compression per 4 stroke, with the following features:

| Parameter | Value |
| --- | --- |
| Power and engine speed | 300 hp at 2,100 rpm |
| Engine displacement | 8.9 liters |
| Compression ratio | 17.8:1 |

This way, the invention shall now be described in detail referring to the accompanying Figures, which illustrate the preferred embodiments of the present invention according to the following examples.

EXAMPLES

In order to determine the feasibility of its application, the energy efficiency of this process was analyzed. The method was tested by analyzing the thermodynamics of the recovery system by means of using different proportions of mass and energy and different working molecules.

The following molecules were selected to work, that is, the chemical species as carbon and hydrogen source or fuel to be reformed:

1) Methane, as it is easily obtained in the form of Compressed Natural Gas (CNG).
2) Methanol, as it has a low cost, it remains liquid at ambient temperature, and can be reformed into hydrogen at significantly lower temperatures than methane.
3) Ethanol, as it can be obtained from renewable raw materials and remains liquid at ambient temperature.

The analysis was performed in a system in a steady state, with an air temperature of about 25° C. and approximately 100 kPa (abs) in the compressor intake, and a container of water preheated by the exhaust gases. The water was used in a saturated liquid state, in a temperature of about 180° C. For the reformation of the methane, the methane was kept at approximately 25° C. and about 2200 kPa (abs). In the case of methanol, the methanol was kept at approximately 25° C. and about 100 kPa (abs), whereas for the reformation of ethanol, the ethanol was kept at approximately 25° C. and about 100 kPa (abs).

The adiabatic efficiency of the engine working as a compressor ($\eta_C$) was about 98%. The global efficiency for the engine ($\eta_E$) was constant, irrespective of engine speed. $M_P[\%]$ was calculated from a $\eta_E$ value of about 40%.

In each of the tested cases, a rated compressor output of about 116 kW was used. For the calculation of dissipated energy in the engine working as a compressor, a rated output of 116 kW that was fixed for every case was added to the power required by the pumps and compressors involved in each of the tested processes.

For the heat exchange processes, there was a maximum temperature approximation of 12° C. between the cold fluid and the hot fluid.

The loss of charge between the heat exchange equipment was equal to zero.

For the purpose of calculating $T_P[\%]$ and $M_P[\%]$, the performance of the engine was considered to be the same for both the combustion of the reagents and the combustion of the products of the reforming reaction.

When comparing the resulting energy for each case, the combustion currents were cooled to approximately 200° C.

An oxygen concentration of about 2% molar volume was used at the engine outlet.

The gases resulting from the reforming reaction were reconditioned up to approximately 40° C.

The assessment was based on two different performance considerations:

i) Thermal performance, fundamentally aimed at evaluating the energy efficiency of the optimization process.

ii) Global mechanic performance, fundamentally aimed at evaluating the net amount of usable energy obtained from the braking. This assessment of performance takes into consideration the thermodynamic efficiency of the internal combustion machine, that is, the Diesel engine of the vehicle.

In every case the aim was to optimize the arrangement of the heat recovery systems, for which the corresponding flow diagrams are provided in FIGS. 1-3.

The water used for generating steam was preheated by means of the exhaust gases during the normal operation speed of the vehicle. This supposes an additional alternative way of taking advantage of the dissipated energy.

This way, the Thermal Performance of the process was defined as the percentage of recovered energy, from the total energy that would have been obtained from the reagent current, in both cases through combustion, either from the fuel used as a reagent or from the reformed gases.

$$R_T[\%]=E_{Recovered}/E_{Reagents}.100=(E_{P.R.}-E_{Reagents})/E_{Reagents}.100$$

Where $T_P[\%]$ is the percentage of thermal performance in the energy recovery and optimization process.

$E_{P.R.}$ is the energy obtained from the combustion of the products of the reforming reaction.

$E_{Reagents}$ is the energy obtained from the combustion of the reagents used in the reforming reaction.

$E_{Recovered}$ is the difference between the energy obtained from the combustion of the products of the reforming reaction, minus the energy obtained from the combustion of the reagents used in the reforming reaction.

It is worth noting that, just as it was defined, the thermal performance is not related to the efficiency of the engine, but to the energy contained in the reagent and product currents. Therefore, it is associated to the energy efficiency of the optimization process.

On the other hand, a Mechanical Performance of the process was defined as the percentage of energy that is reused, in respect to the total energy that originally dissipated into the environment in braking.

$$R_M[\%]=E_{Recovered}/E_{Dissipated}.\eta_M.100=(E_{P.R.}-E_{Reagents})/E_{Dissipated}.\eta_M.100$$

Where $M_P[\%]$ is the percentage of mechanical performance in the energy recovery and optimization process.

$E_{P.R.}$ is the energy obtained from the combustion of the products of the reforming reaction.

$E_{Reagents}$ is the energy obtained from the combustion of the reagents used in the reforming reaction.

$E_{Recovered}$ is the difference between the energy obtained from the combustion of the products of the reforming reaction, minus the energy obtained from the combustion of the reagents used in the reforming reaction.

$E_{Dissipated}$ is the energy dissipated in the engine acting as a compressor plus the energy required to drive the pumps and compressors involved in the process. In every case, it refers to the energy dissipated in the braking.

$\eta_E$ is the global efficiency of the engine.

It is worth noting that the presented models operate in a continuous way, meaning that they involve volumes that can be expressed as quantities of matter per unit of time. Therefore, the energy currents involved in the models are expressed in terms of energy per unit of time, that is, power.

Example 1

Taking this data into consideration, the energy recovery was performed using methane as carbon and hydrogen source.

FIG. 1 represents the flow diagram designed for the recovery of part of the energy corresponding to the braking of a vehicle, using the conventional reforming reaction for methane ($CH_4$) as carbon and hydrogen source, using the engine as a compressor during the braking of the vehicle and using the thermal energy contained in the exhaust gases of said compressor.

The diagram in FIG. 1 shows the air intake into the K-100 compressor, the vehicle engine, through flow 1. Flows 2, 48, 3, 4, 18 and 19 refer to hot air flowing through a variety of exchangers, transferring their heat to the catalytic reactor, the E-100 exchanger, the water flow in exchanger E-101 and to the methane flow in exchanger E-104.

Water enters through flow 27 and is pumped by pump P-100. Pressured methane enters through flow 17.

Water and methane flows join in the MIX-100 mixer and enter the GBR-100 catalytic reactor. Inside, chemical reactions take place that produce hydrogen, carbon monoxide and carbon dioxide in variable quantities, depending on operational conditions.

At the outlet of the catalytic reactor, flow 9, the resulting mixture will be composed of water steam and unreacted methane, carbon monoxide, carbon dioxide and hydrogen.

Flow 9 leaves the GBR-100 catalytic reactor with energy that still can be used, which is then used to preheat the methane and water of exchangers E-102 and E-103 respectively.

Next, flow 16 enters exchanger E-105 where it dissipates heat into the environment (wasted energy). This way, the residual water of the reaction is condensed and the gases are conditioned for storage. The V-100 two-phase separator allows the extraction of condensed water from its bottom (flow 22), and the flow of gases to be stored from its top (flow 21).

The results and data obtained are summarized in Table 1 below:

TABLE 1

| Parameter | Value |
| --- | --- |
| Compression ratio | 17.8:1 |
| Intake pressure | 100 kPa (abs) |
| Pressure at valve opening time | 5,631 kPa (abs) |
| Volume of air | 22.15 kmol/h. |
| Volume of water | 1.34 kmol/h. |
| Volume of methane | 1.34 kmol/h. |
| Energy obtained from the combustion of the products of the reforming reaction ($E_{P.R.}$) | 283.88 kW. |
| Energy obtained from the combustion of the reagents used in the reforming reaction ($E_{Reagents}$) | 274.88 kW. |
| The result of $E_{P.R.}$ minus $E_{Reagents}$ ($E_{Recovered}$) | 9.0 kW. |
| Dissipated energy ($E_{Dissipated}$) | 115.9 kW. |
| Percentage of thermal performance in the energy recovery and optimization process ($T_P$) | 3.27% |
| Percentage of thermal performance in the energy recovery and optimization process ($T_P$) | 3.11% |

The thermal performance of the reforming process with methane used as a preferred embodiment for the alkanes, is mainly related to the hydrogen concentration obtained at the outlet of the reforming reactor, and in turn, the latter is related to the temperature of the gases at the outlet of the reactor. The higher the temperature in the outlet, the more the reaction equilibrium shifts towards the products: hydrogen, carbon monoxide, etc, and therefore a better thermal performance is obtained. The smaller the quantity of matter being fed to the reactor, the higher the value of thermal performance.

However, as the quantity of matter fed to the reactor increases, the total number of hydrogen moles produced will increase too, even though the concentration of hydrogen in the gas flow decreases, which determines the increase in the mechanical performance of the process.

On the other hand, the increase of the $H_2O/CH_4$ molar feeding ratio, keeping a constant number of moles being fed to the reactor, produces an increase in the thermal performance of the process due to a larger shift in the reaction equilibrium. Conversely, the higher the $H_2O/CH_4$ molar feeding ratio, the larger the amount of heat that needs to be expelled in order to condense and separate the residual water after the reforming reaction.

The thermal and mechanical performance for the conventional methane reformation process is relatively low, due to the fact that the methane reformation process requires higher temperatures in order to achieve significant conversions.

Example 2

In the same way, the energy recovery was performed using methanol as carbon and hydrogen source instead of methane.

The diagram in FIG. 1 is similar to the one in Example 1 for the conventional methane reformation process (see FIG. 1), with the addition of the P-101 pump that allows the pumping of the liquid methanol of flow 47, which is stored in a reservoir at atmospheric pressure.

In this method of production, the methanol is made to react with water to obtain hydrogen, carbon monoxide and carbon dioxide in variable quantities, depending on operational conditions.

The results and data obtained are summarized in Table 2 below:

TABLE 2

| Parameter | Value |
|---|---|
| Compression ratio | 17.8:1 |
| Intake pressure | 100 kPa (abs) |
| Pressure at valve opening time | 5,631 kPa (abs) |
| Volume of air | 22.15 kmol/h |
| Volume of water | 1.34 kmol/h |
| Volume of methanol | 1.34 kmol/h |
| Energy obtained from the combustion of the products of the reforming reaction ($E_{P.R.}$) | 256.45 kW |
| Energy obtained from the combustion of the reagents used in the reforming reaction ($E_{Reagents}$) | 216.70 kW |
| The result of $E_{P.R.}$ minus $E_{Reagents}$ ($E_{Recovered}$) | 39.75 kW |
| Dissipated energy ($E_{Dissipated}$) | 115.95 kW |
| Percentage of thermal performance in the energy recovery and optimization process ($T_P$) | 18.34% |
| Percentage of mechanical performance in the energy recovery and optimization process ($M_P$) | 13.71% |

The thermal performance of the process is related to the concentration of hydrogen and carbon monoxide achieved at the outlet of the reforming reactor, which in turn is related to the outlet temperature of the reactor gases. The higher the temperature in the outlet, the higher the carbon monoxide concentration, while the hydrogen concentration does not have a significant variation. Therefore, the lower the quantity of matter being fed to the reactor, the higher the thermal performance value.

However, as the quantity of matter fed to the reactor increases, the total number of hydrogen moles produced will increase too, which determines the increase in the mechanical performance of the process.

On the other hand, the thermal performance of the process practically remains unchanged when the $H_2O/CH_3OH$ molar feeding ratio is increased from 1.00 to 2.50, keeping a constant number of moles being fed to the reactor. This is due to the fact that for a $H_2O/CH_3OH$ molar feeding ratio of 1.00, the reaction equilibrium is already shifted towards the products. On the other hand, a significant decrease in the mechanical performance will take place with a similar variation in the $H_2O/CH_3OH$ molar feeding ratio, due to the decrease in the quantity of methanol moles fed to the reactor, not allowing for significant increases in the conversion.

The thermal and mechanical performance values for the conventional methanol reforming process are high because the reforming reaction yields significant conversions in the temperature range that can be achieved in the kinetic energy recovery process during the braking of a large-sized vehicle.

Example 3

In the same way, the energy recovery was performed using ethanol as carbon and hydrogen source instead of methane.

The diagram in FIG. 3 is similar to the one of Example 1 for the conventional methane reformation process (see FIG. 1), with the addition of the P-101 pump that allows the pumping of the liquid ethanol of flow 47, which is stored in a reservoir at atmospheric pressure.

In this case, the ethanol is made to react with water to obtain hydrogen, carbon monoxide and carbon dioxide in variable quantities, depending on operational conditions.

This process yields results showing an extremely low performance, due to unreacted ethanol condensing at E-105 and being separated from the gas flow in separator V-100 together with the unreacted water. This way, a large amount of chemical energy contained in the ethanol leaves the bottom of the V-100 separator and is not stored and used in the engine.

This inherent problem with ethanol is what makes it an unappealing choice as a reagent for the reforming reactor. In any case, its use is feasible by enhancing its performance, through adaptations to the system, for instance by recycling the mixture water-ethanol.

CONCLUSIONS

The use of methanol produces a significantly better performance than methane given that the former is reformed at lower temperatures, achieving a better advance in the reforming reaction which produces more hydrogen.

Methanol has the additional advantage of having a higher energy concentration. A gallon of methanol has 1.8 times more energy than a gallon of natural gas at a 200 bar pressure. This means that consumption during braking is much lower for methanol than for natural gas, resulting in smaller and less expensive fuel reservoirs.

This performance means that with methanol, a vehicle that reduces its potential energy in a 109 yard slope could recover up to 19 yard in the slope by burning the reformed gas as fuel.

To bring a more realistic perspective to the problem, the volumes of methanol, water and reformed gas required by a 20 ton vehicle to descend a 437 yard slope in an 18 mile stretch were calculated, which subjects the brake system of such a vehicle to considerable stress. The braking was assumed to be done exclusively by the energy recovery system proposed on the basis of the "Jake Brake" system.

The chemical energy gained from methanol allows this vehicle to gain a potential energy of 77 yards. The 437 yard loss of potential energy generates a methanol consumption of 4 gallons and a water consumption of 1.8 gallons. The volume required to store the produced reformed gas is of 0.4 gallons at 22 bar, the pressure at which the reforming reactor operates.

While the volume of the involved reagents is not too large, the volume of the resulting product as a synthesis gas would prove problematically high. This problem can be managed by performing a compression of the reformed gas to be stored to a 200 bar pressure. In such case, the volume required to store the resulting reformed gas would be of 46 gallons, and the mechanical performance of the process would approximately decrease to 15%, which would mean that the chemical energy gained by the process would allow the vehicle to gain a potential energy of 66 yards instead of the 77 yards of a 22 bar storage.

Therefore, it is concluded that recovery and optimization processes of vehicle braking energy through fuel reforming are feasible.

However, the economic feasibility of the processes relies heavily on the relative price of Diesel fuel and whatever carbon and hydrogen source is used in reforming. Given that the relative prices vary over time, so does the economic feasibility.

A series of changes and modifications can be implemented without straying from the spirit and scope of the present invention, and such changes and modifications are intended to be considered as covered by the claims that follow.

Having described the invention, what is claimed as new and is sought to be protected is the following:

1. A method for producing a gaseous fuel comprising hydrogen from kinetic and/or potential energy recovered from a vehicle powered by a four stroke Diesel engine fitted with an engine brake (Jacobs brake) during a deceleration stage, the method comprising the following steps:
   a) providing a preheated steam flow,
   b) providing a gas flow from at least one chemical species used as preheated carbon and hydrogen source,
   c) mixing the gas flow from at least one chemical species used as carbon and hydrogen source from step b) with the steam flow from step a),
   d) reacting a mixture of at least one chemical species used as carbon and hydrogen source and steam in a catalytic bed of a reforming reactor, heated only by high temperature air from the compression stage of the Diesel engine acting as engine brake upon deceleration, producing an outlet synthesis gas flow which contains hydrogen,
   e) causing water to condense in the outlet synthesis gas flow which contains hydrogen, producing a water-free synthesis gas flow, and
   f) storing the synthesis gas flow obtained at step e) in a reservoir for its subsequent use during an acceleration stage of the vehicle.

2. The method according to claim 1, wherein the preheating of step a) is achieved by exchanging heat through the exhaust gases produced by the engine during normal operation.

3. The method according to claim 1, wherein the preheating of step a) is achieved by exchanging heat with the high temperature synthesis gas from step d).

4. The method according to claim 1, wherein the preheating of step a) is achieved by exchanging heat with the high temperature air from the compression stage where the Diesel engine acts as an engine brake.

5. The method according to claim 1, wherein the steam is created in a boiler in which water is heated by the exhaust gases produced by the engine during normal operation.

6. The method according to claim 1, wherein the preheating of step b) is achieved by exchanging heat through the exhaust gases produced by the engine during normal operation.

7. The method according to claim 1, wherein the preheating of step b) is achieved by exchanging heat with the high temperature synthesis gas from step d).

8. The method according to claim 1, wherein the preheating of step b) is achieved by exchanging heat with the high temperature air from the compression stage where the Diesel engine acts as an engine brake.

9. The method according to claim 1, wherein the mixture of the steam flow from step a) with the gas flow of step b) from the at least one chemical species used as carbon and hydrogen source takes place in a gas mixer.

10. The method according to claim 1, wherein the mixture of the steam flow from step a) with the gas flow of step b) from the at least one chemical species used as carbon and hydrogen source takes place in the catalytic bed of a reforming reactor.

11. The method according to claim 1, wherein the at least one chemical species used as carbon and hydrogen source is selected from the group of alkanes consisting of methane, ethane, propane, butane, and their mixtures, and from the group of alcohols consisting of methanol, ethanol, propanol, and their mixtures.

12. The method according to claim 1, wherein the synthesis gas is mixed with the fuel used by the Diesel engine during an acceleration stage of the vehicle.

13. The method according to claim 1, wherein the synthesis gas is mixed with the feeding air used by the Diesel engine during an acceleration stage of the vehicle.

14. The method according to claim 12, wherein the mixture ratios are controlled by means of an Electronic Fuel Injection Controller (EFIC).

15. The method according to claim 1, wherein the four-stroke Diesel engine is mounted on a vehicle.

16. A system for recovering kinetic and/or potential energy from a vehicle powered by a four stroke Diesel engine fitted with an engine brake (Jacobs brake) during a deceleration stage in the form of a hydrogen gaseous fuel, the system comprising:
   a water container, a pump which draws water from the container, and an exchanger that can exchange heat with the hot air produced by the Diesel engine acting like an engine brake, and which vaporizes the incoming water and raises the temperature of the steam generated,
   a container with at least one chemical species used as carbon and hydrogen source, and an exchanger able to exchange heat with the hot air produced by the Diesel engine working as an engine brake, and which vaporizes at least one incoming chemical species used as carbon and hydrogen source and raises the temperature of the at least one carbon chemical species,
   a reactor for reforming at least one chemical species used as preheated carbon and hydrogen source coming from the container of said chemical species used as carbon and hydrogen source, with preheated steam coming from the water container, where said reforming reactor also includes an outlet duct for synthesis gas that contains hydrogen, and is only capable of exchanging heat with the hot air resulting from the Diesel engine acting as an engine brake upon deceleration,
   a means for delivering the hot air to the reactor only during engine braking, and
   a heat exchanger that cools the synthesis gas at the exit of the reforming reactor, a liquid/vapor separator with external loss of heat, connected to the reactor in order to recover unreacted water from the synthesis gas, and a container for said synthesis gas which contains hydrogen and constitutes the gaseous fuel coming from the reforming reactor.

17. The system according to claim 16, further comprising one or more additional heat exchangers interspersed between the operational units in order to optimize the use the heat in the system.

18. The system according to claim 16, further comprising a gas mixer where the preheated steam flow and the at least one chemical species used as carbon and hydrogen source in a preheated gas phase converge for their homogenization prior to entering the reforming reactor.

19. The system according to claim 16, further comprising a water vaporization boiler that receives the water pumped from the water container, and whose heating is provided by the thermal exchange of the hot air produced by the Diesel engine acting as an engine brake, and/or from the exhaust gases produced by the Diesel engine during acceleration, and/or by means of thermal recovery of the system itself.

20. The system according to claim 18, further comprising a gas mixer where the steam flow from the water vaporization boiler and the at least one chemical species used as carbon and hydrogen source in a preheated gas phase converge for their homogenization prior to entering the reforming reactor.

21. The system according to claim 16, further comprising a container of the at least one chemical species used as carbon and hydrogen source if in a liquid state and a pump which takes said at least one chemical species used as carbon and hydrogen source to take it to at least one heat exchanger, where it is turned into vapor and preheated.

22. The system according to claim 21, further comprising a gas mixer where the preheated steam flow and the at least one chemical species used as carbon and hydrogen source in a preheated gas phase converge for their homogenization prior to entering the reforming reactor.

23. The system according to claim 16, wherein the at least one chemical species used as carbon and hydrogen source is selected from the group of alkanes consisting of methane, ethane, propane, butane, and their mixtures, and from the group of alcohols consisting of methanol, ethanol, propanol, and their mixtures.

24. The system according to claim 16, wherein the synthesis gas is dosed from the reservoir and is mixed with the fuel used by the Diesel engine during an acceleration stage of the vehicle.

25. The system according to claim 16, wherein the synthesis gas is dosed from the storage container and is mixed with the supply air used by the Diesel engine during an acceleration stage of the vehicle.

26. The system according to claim 24, wherein the mixture ratios are controlled by means of an Electronic Fuel Injection Controller (EFIC).

27. The system according to claim 16, wherein the four-stroke Diesel engine is mounted on a vehicle.

\* \* \* \* \*